United States Patent [19]

Fortescue

[11] Patent Number: 4,569,820
[45] Date of Patent: Feb. 11, 1986

[54] NUCLEAR REACTOR CORE AND FUEL ELEMENT THEREFOR

[75] Inventor: Peter Fortescue, La Jolla, Calif.

[73] Assignee: GA Technologies Inc., San Diego, Calif.

[21] Appl. No.: 263,300

[22] Filed: May 13, 1981

[51] Int. Cl.⁴ ............................................. G01C 21/28
[52] U.S. Cl. .................................. 376/427; 376/458; 376/459; 376/385; 376/381
[58] Field of Search ............... 376/385, 427, 458, 459, 376/265, 381, 383, 384, 357, 304

[56] References Cited

U.S. PATENT DOCUMENTS

| | | | |
|---|---|---|---|
| 2,863,815 | 12/1958 | Moore et al. | 376/285 X |
| 2,872,398 | 2/1959 | Ashley et al. | 376/459 |
| 2,929,768 | 3/1960 | Mahlmeister et al. | 376/458 X |
| 3,063,923 | 11/1962 | Mayer | 204/154.2 |
| 3,076,753 | 2/1963 | Bell | 376/454 X |
| 3,081,247 | 3/1963 | Balent | 204/193.2 |
| 3,093,568 | 6/1963 | Cox | 204/193.2 |
| 3,206,373 | 9/1965 | Dupuy | 176/84 |
| 3,248,299 | 4/1966 | Junkermann et al. | 376/458 X |
| 3,296,086 | 1/1967 | Boutin et al. | 376/459 |
| 3,329,576 | 7/1967 | Rouge et al. | 176/84 |
| 3,413,196 | 11/1968 | Fortescue et al. | 376/352 X |
| 3,441,477 | 4/1969 | Stamford et al. | 176/59 |
| 3,607,643 | 4/1969 | Paget | 176/71 |
| 4,199,405 | 4/1980 | Schweiger | 376/458 |

FOREIGN PATENT DOCUMENTS

| | | | |
|---|---|---|---|
| 2835419 | 2/1980 | Fed. Rep. of Germany | 376/458 |
| 812809 | 4/1959 | United Kingdom | 376/458 |

*Primary Examiner*—Peter A. Nelson
*Attorney, Agent, or Firm*—Fitch, Even, Tabin & Flannery

[57] ABSTRACT

The present invention relates to a nuclear reactor core and fuel elements therefore. Stackable fuel elements, having the usual coolant holes machined therethrough, are formed with grooves along their vertical extent for alignment with similar grooves on adjacent fuel elements to define additional coolant passageways. These grooves provide coolant passageways between adjacent fuel elements enhancing the mechanical stability of the core. Furthermore, these additional coolant passageways allow a more efficient utilization of reactor core space and permit coolant escaping into the interstices between adjacent ends of blocks to be collected at these additional coolant passageways. Stability may be enhanced further by means of complementary elevations and depressions formed on end faces of the fuel blocks.

3 Claims, 5 Drawing Figures

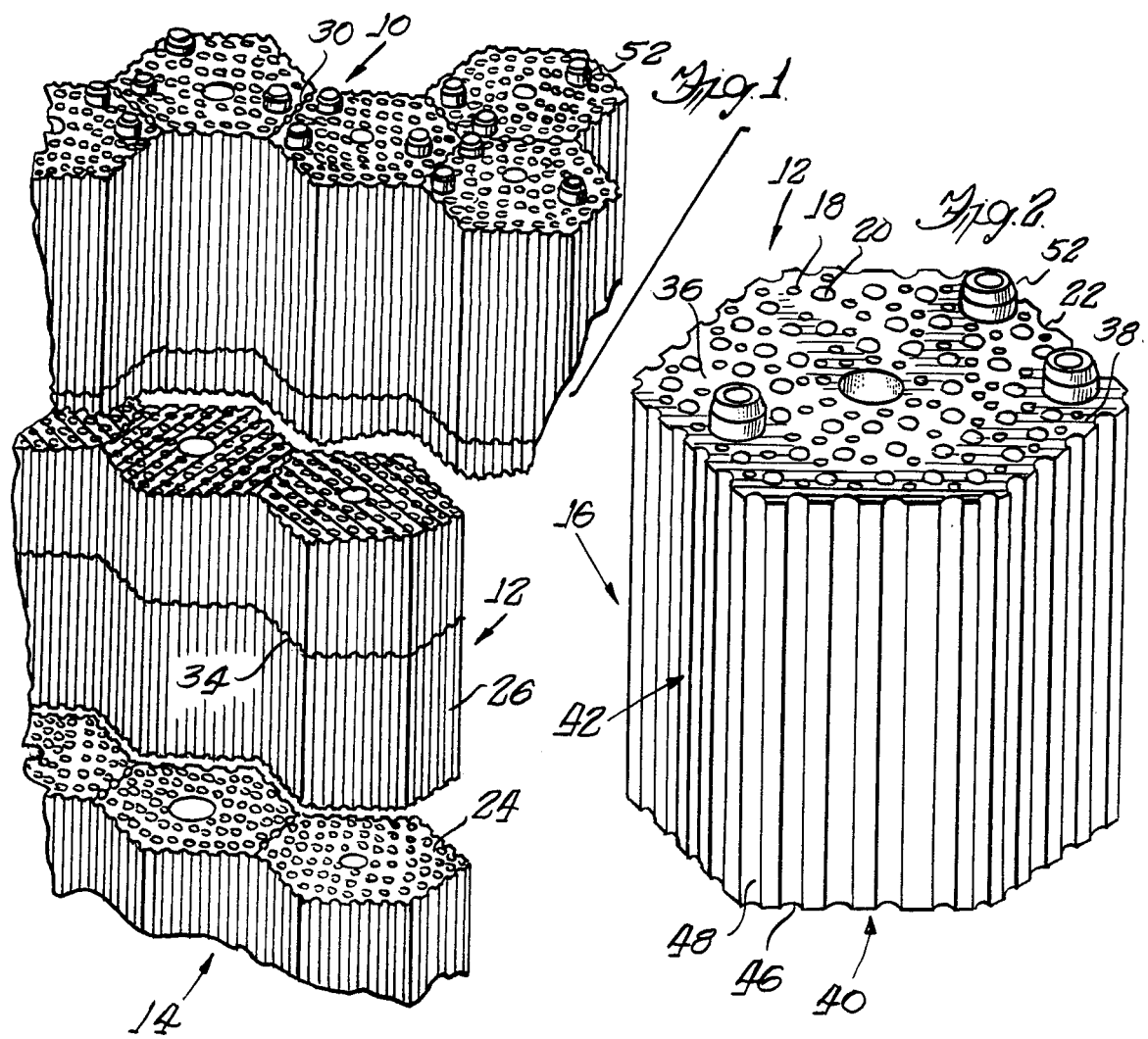
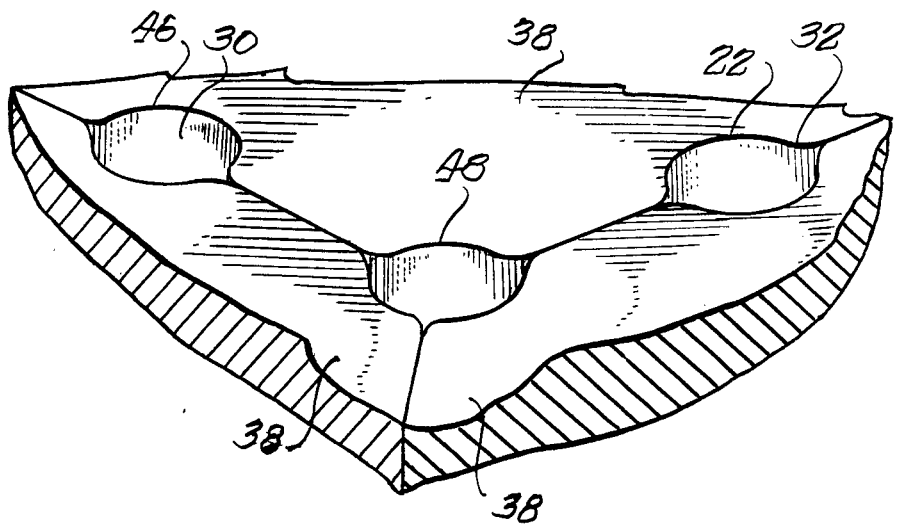

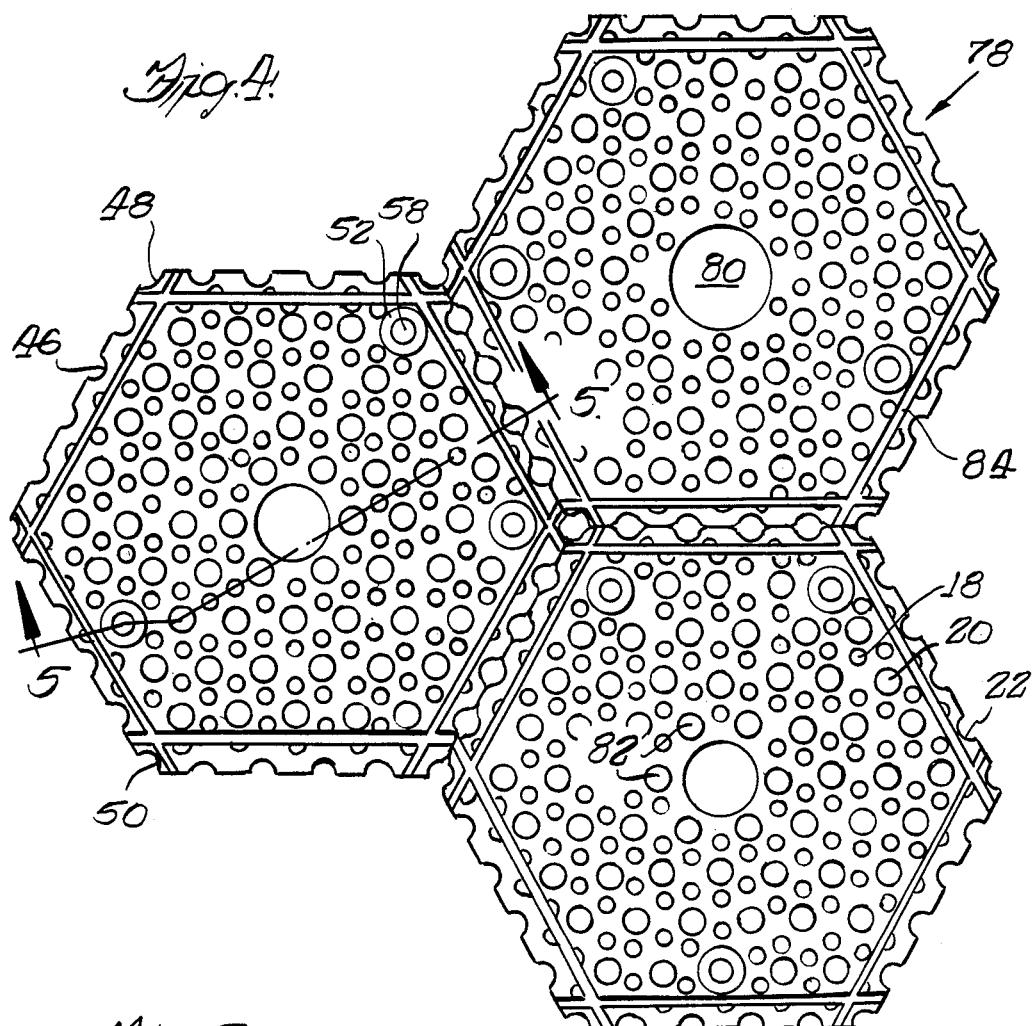
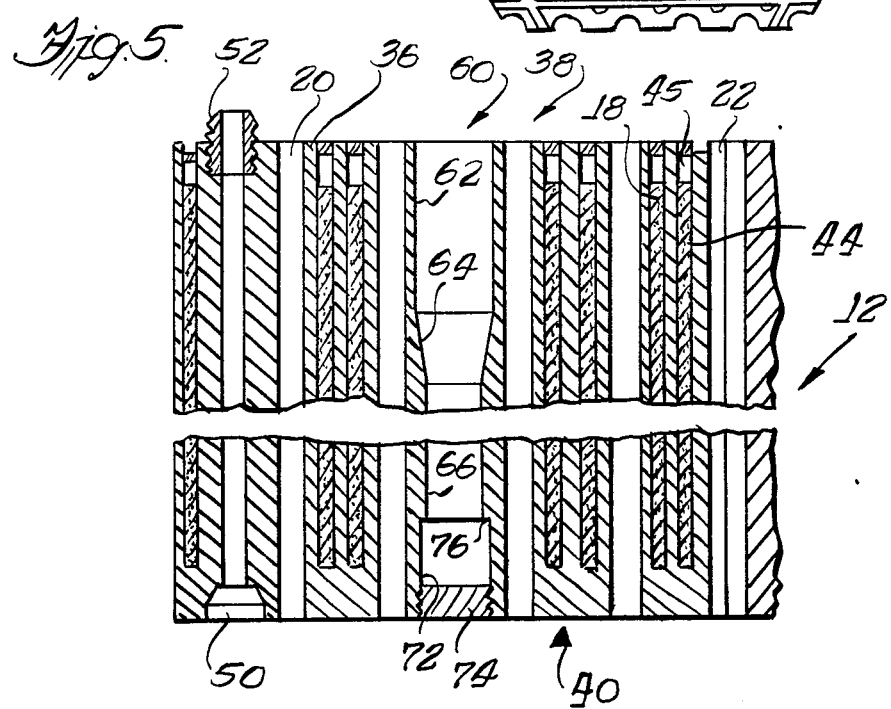

among the parameters of fuel capacity, coolant cross section and minimum ligament thickness.

In particular, intercolumn coolant passageways provide an escape for wayward coolant so that haphazard interblock pressure buildup is virtually eliminated. These intercolumn coolant passageways may be formed from vertical grooves channeled about the periphery of each fuel element of a nuclear reactor core. The grooves of vertically adjacent fuel elements align so that the fuel columns are themselves channeled. When the fuel columns are interfitted side-by-side, as they are in the reactor core, column grooves mate so as to define the coolant passageways between the columns.

The intercolumn coolant passageways are highly space efficient in that they make effective use of the block perimeters. This more efficient use of space allows for more optimal compromises in the allocation of fuel block volume to fuel capacity, coolant cross section, and ligament thickness. Additionally the inclusion of the external grooves permits a preferable pattern of coolant passageways, yielding a uniform matrix of equally spaced passageways throughout the core.

Finally, complementary elevations and depressions formed on the end faes of the fuel blocks alleviate various problems attributable to the confusion of intercolumn flow and intracolumn flow. The depressions and elevations may extend along the perimeters of the faces of the blocks so as to form "steps". Alternatively, the depressions and elevations may be spaced from and extend parallel to the parameters of the faces of the blocks; in this latter case, the elevations may be formed by inserting "one or more strips into depressions on one of the two faces of the two faces of each block".

These complementary elevations and depressions interfit when the blocks are assembled into columns and serve to reduce the confusion between the intercolumn flow and the intracolumnflow. Accordingly, the engaged depressions and elevations diminish the deleterious and unpredictable effects due to flow infusion.

The primary object of this invention is to provide a nuclear reactor core which will enhance the inherent operational stability of current HTGR reactor designs.

A related object of this invention is to provide a reactor core with improved heat transfer capability and fuel elements for the same.

Another object of this invention is to provide a nuclear reactor core with greater tolerance of interblock clearances and without sealants at entry or exit plenums, and fuel elements for the same.

A further object of this invention is to provide a nuclear reactor core with an increased fuel and coolant capacity which maintains or increases fuel block strength.

BRIEF DESCRIPTION OF THE DRAWINGS

FIG. 1 is a fragmentary view of a nuclear reactor core in accordance with the present invention.

FIG. 2 is a perspective view of a fuel element in accordance with the present invention.

FIG. 3 is a sectional view taken along line 3—3 of FIG. 2.

FIG. 4 is a plan view of fuel elements in accordance with the present invention.

FIG. 5 is an enlarged fragmentary view taken from FIG. 4.

DESCRIPTION OF THE PREFERRED EMBODIMENT

Referring to the drawings, a nuclear reactor core 10, a fragment of which is shown generally in FIG. 1, comprises a plurality of fuel elements 12 stacked to form columns 14 which in turn are interfitted side-by-side to form the core. Each fuel element is formed from a graphite block 16 and machined to have fuel chambers 18 and coolant holes 20. When a number of fuel elements 12 are stacked to form a column 14, the coolant holes align so as to form vertically extending coolant passageways through vertically adjacent blocks between the blocks. These passageways are referred to a "intracolumn coolant passageways" 24 to distinguish them from interblock coolant passageways to be described below.

Heretofore, coolant escaping from an entry plenum (not shown) and from intracolumn passageways 24 and into interstices 34 between adjacent blocks could create pressure differentials that could destabilize the core. Furthermore, prior to the present invention, core space was not utilized efficiently; in particular, the sides 42 of the fuel element blocks 16 were not used either for power generation or heat transfer purposes.

In accordance with the present invention, coolant grooves 22 are formed into the sides 42 of the fuel element blocks 16. The grooves are vertical and extend from a top face 38 to a bottom face 40 of each block incorporating the present invention. The grooves are positioned so that, when blocks are stacked vertically, the grooves of vertically adjacent blocks align, defining column grooves 26, i.e. grooves along the entire vertical extent of a reactor column 14. When a number of columns are interfitted side-by-side, these column grooves mate so as to define coolant passageways between the columns.

Considered from another perspective, the intercolumn coolant passageways 28 comprise vertically aligned interblock coolant passageways 30. The interblock coolant passageways are formed when the grooves 22 of horizontally adjacent blocks mate.

The present invention makes it possible for coolant escaping from the entry plenum and the intracolumn coolant passageways 24 and into interstices 34 between adjacent blocks to flow into the intercolumn coolant passageways 28; the resulting increased absolute intercolumn flow results in smaller pressure differentials around the individual fuel blocks so that there is a decreased tendency for the blocks to move and for the core to destabilize.

Furthermore, the present invention allows for the more effective use of reactor core space as exemplified in the preferred arrangement (best indicated in FIG. 4) of fuel chambers and coolant holes. The preferred fuel element 12 has greater fuel capacity, coolant cross section, and minimum thickness of ligament 36 than a same size block in accordance with the limitations of the prior art. The number and arrangement of the coolant holes and grooves and the fuel chambers may be altered, as can their diameters. This will allow alteration and fine tuning of the balance between fuel capacity, coolant flow capacity and minimum ligament size. Thus, the present invention provides for greater power, greater heat transfer, and greater mechanical integrity while enhancing the inherent safety and durability of a nuclear reactor.

NUCLEAR REACTOR CORE AND FUEL ELEMENT THEREFOR

BACKGROUND OF THE INVENTION

The present invention relates generally to a nuclear reactor core and fuel elements therefor, and more particularly to a nuclear reactor core for a high temperature gas-cooled reactor (HTGR) comprising stackable fuel elements.

In order that spent nuclear fuel may be cyclically replaced, a nuclear reactor core may be constituted by fuel elements comprising stackable blocks having fuel chambers. Generally, such fuel elements have passageways so that coolant gas can flow through the blocks and columns to cool the core and transfer the generated heat. Stackable fuel elements may be stacked to form fuel columns which may in turn be interfitted side-by-side to constitute the reactor core. One convenient stackable form is a hexagonal prism.

It has been found that in such an assembled core, coolant may escape into interstices between vertically and horizontally adjacent blocks from the entry plenum, bypassing the intended coolant passageways. Additionally, coolant gas can escape from the coolant passageways and into the interstices. The escaped coolant gas could build up pressure haphazardly in the gaps between the blocks. This uneven buildup of pressure could exert mechanical forces sufficient to move the blocks and destabilize the core. The shutdown of the nuclear reactor at Fort St. Varian, Colorado, is partly attributable to such flow instabilities.

One solution to such problems has been to require small interblock clearances and sealing at either the entry or exit plenum faces. The sealing and the closer machining tolerances for the fuel blocks constitutes an additional expense and an impediment to the efficient replacement of fuel elements for refueling purposes.

The designer is faced with compromising among conflicting design objectives. That is, one goal of reactor design is to maximize power output. One factor in determining power output in a stackable core is the fuel capacity of the fuel elements. It is desirable to maximize the volume of the fuel chambers of the individual fuel blocks. However, high fuel and power capacity presents certain complications.

In the first place, high power capacity requires that more heat be transferred from the core so that the generated power can be used and so that the core does not overheat. Cooling and heat transfer may be provided for by means of holes drilled vertically through the fuel elements. The holes align with corresponding holes in vertically adjacent blocks so that coolant passageways extend vertically through the reactor columns. A large cross-sectional area of coolant holes is desirable to maximize the cooling and heat transfer characteristics of the system. In operation, gas flows downwardly through the coolant passageways removing heat from the core.

Furthermore, it should be understood that the fuel element blocks are subjected to considerable stress, and that higher power tends to create greater stress. The fuel blocks are subject to extremes of heat and radioactive bombardment. In the case of heat, the blocks are subjected not only to high maximum temperatures, but also to severe temperature gradients which can induce differential expansion so as to impose mechanical stresses in the blocks themselves. Furthermore, the blocks may be subjected to other mechanical stresses through block movements. Fuel blocks must, therefore, be constructed of highly refractory material such as graphite. Since the block is peppered with fuel chambers and coolant holes, it is necessary to maintain a minimum ligament thickness between such holes and chambers so that the block can withstand the stresses imposed upon it.

It will be apparent from the foregoing that some of the design goals for stackable fuel elements are in conflict. In particular, for a given size block, the goals of maximizing fuel capacity to achieve high power output, maximizing coolant cross section to facilitate heat transfer, and maximizing ligament thickness to ensure mechanical integrity under high stress oppose one another. For example, one cannot maximize the size of the fuel holes and the coolant holes and still maintain adequate ligament thickness between the holes.

Consequently, fuel element design is concerned with determining optimal comprises among fuel capacity, coolant cross section, and ligament thickness. As discussed below, the present invention permits comprises superior to those available under the constraints of the prior art. An arrangement of fuel chambers and coolant holes that effects a good compromise considering the limitations of the art prior to the present invention is taught in Fortescue et al., U.S. Pat. No. 3,413,196, which is incorporated herein as though quoted in full.

Confusion of intercolumn coolant flow and intracolumn coolant flow is another problem addressed by the present invention. The problem is particularly acute with respect to core designs incorporating commonly orificed seven-column zones or "patches". In such a core, each patent is covered by a cap with a variable orifice to control the coolant flow through each patch. Gaps between the caps of adjacent patches permit coolant to flow between the patches. Thus the between-patch flow is often under a different pressure than that of the within-patch flow, thereby contributing to the mechanical instability of the blocks discussed above.

Slight tilting of fuel blocks due to pressure differentials (or possibly surface irregularities in the block) enlarges the interstices between vertically adjacent blocks creating a pressure drop in the region between such blocks. This pressure drop can draw some of the between-patch flow across the horizontal faces of the throttle the coolant flow through the intended coolant passageways impairing the efficiency of the cooling system and adding further uncertainties to the coolant pressure distribution. Moreover, the cross-flow has been known to enter handling holes and flow toward the coolant, thereby reducing coolant efficienty.

These inefficiencies and pressure differentials are not important so much because of their magnitude, but because of the uncertainity they introduce into the reactor.

SUMMARY OF THE INVENTION

In accordance with the present invention, means are provided for the elimination of haphazard local pressure buildup within a nuclear reactor core without the use of sealants. The present invention is forgiving of block surface irregularities, thereby mitigating the consequences of small manufacturing errors and enhancing the inherent safety of the reactor. Furthermore, the present invention provides for more optimal comprises In an operating nuclear reactor with a core in accordance with the present embodiment, coolant fluid, preferably helium gas, passes through the intracolumn 24 and intercolumn 28 coolant passageways so that the heat—generated by the fuel in the fuel chambers and transferred through the graphite ligament 36—may be transferred away from the core to be converted into usable energy. Such a reactor may be simply provided with differential coolant flow therethrough by means of orifices placed at the entry ends of the coolant passageways. In this manner, a greater amount of coolant may be allowed to flow through the central fuel elements 12 wherein the peak power is generated so that the outlet temperature of the coolant from these passageways approximates the average coolant outlet temperatures throughout the entire reactor.

Referring to the drawings in greater detail, each fuel element 12 comprises a block 16, preferably in the form of a channeled right regular hexagonal prism. "Prism" is to be taken in the geometric sense as a solid figure whose ends or faces 38 and 40 are polygonal, equal in size and shape, and parallel, and whose sides are parallel. A "right regular hexagonal prism" is further characterized in that it has six equal sides 42 perpendicular to the ends which are regular hexagons. The preferred fuel element block 16 is machined from graphite having a density of 1.70 grams per cubic centimeter or more, and a tensile strength of at least 105 kilograms per square centimeter. In the preferred embodiment the blocks have a height of 396.5 millimeters; the hexagonal faces 38 and 40 are 207.3 millimeters across each side, and 361.0 millimeters across the flats.

The fuel chambers 18 are drilled axially from the top face 38 and extend downwardly to a vertical position near bottom face 40. The fuel holes are filled with nuclear fuel in the form of coated particles 44 (FIG. 5) which are contained within the chamber 18 by a plug 45 cemented in the top end of the fuel chamber, as shown in FIG. 5. Preferably, the fuel chambers are cylindrical having a diameter of 15.9 millimeters and extend to within 6.4 millimeters of the bottom face. The mass of the fuel element with fuel is 68.0 kilograms.

The coolant holes 20 are drilled completely through the block from top face 38 to bottom face 40 parallel to the fuel chambers 18. The coolant holes are preferably cylindrical and have a diameter of 21.0 millimeters, which corresponds to a radius of 10.5 millimeters.

In accordance with the present invention, the usual flat sides of conventional blocks are provided with coolant grooves 22 extending axially from top face 38 to bottom face 40 about the radial periphery of the block. The coolant grooves may be subdivided into side grooves 46 which are channeled into the sides 42 of the block, and edge grooves 48 which are channeled into the edges 50 of the block. Preferably, the side grooves are semi-circular, the edge grooves are one-third circle arcs; all preferred grooves 22 have a radius of 10.5 millimeters. Preferably, the grooves have rounded lead-ins 32 to accommodate misalignment and reduce gap sensitivity when the core is assembled as described subsequently.

To facilitate alignment of the individual fuel elements 12 in a column 14, the blocks 16 are provided with interengaging means at end faces 38 and 40 thereof. In the illustrated fuel element 12, interengaging pins 52 and cavities 54 (FIG. 5) are employed. Herein, each of the fuel elements includes three upstanding graphite pins 52 which are set in the top faces 38 of the blocks 16. To register with the pins, three cavities 54 are provided in the bottom faces 40 of the blocks. Accordingly, when the fuel elements 12 are stacked one atop another, the three upstanding pins 52 at the top of each fuel element serve to precisely locate the fuel element next above it. As best seen in FIG. 5, the pins are each aligned axially with a coolant hole 20. The pins are generally tubular in shape so that hollow bores 58 of the pins serve to interconnect the coolant holes of adjacent blocks 16 into continuous coolant passageways in a column 14 of fuel elements.

In the embodiment illustrated a handling hole 60 is drilled coaxially into the top face of the block, as shown in FIG. 5. The hole includes an upper cylindrical portion 62 which extends downwardly from the top face 38 to a bridge portion 64 which leads downwardly to a narrower cylindrical portion 66. Accordingly, the bridge portion has circular radial cross sections and a trapezoidal axial cross section. The lower narrow portion 66 extends downwardly to a counterbored cylindrical portion 72. A cement counterbore plug 74 at the base of the fuel block 16 serves to seal off the handling hole from coolant flow. The differential diameters of the counterbore and the narrow portion of the hole cause a lip 76 to be formed at their juncture. The lip is designed to permit lifting of the fuel element. A long cylindrical tool (not shown) on the end of a fuel handling machine (not shown) can pass down through the handling hole; the tool can expand when it reaches the counterbore 72 so as to engage the lip 76 that will act as a lifting ledge, so that the element can be lifted from the core. In the preferred embodiment the diameter of the upper cylindrical portion 62 is 54 millimeters in diameter, and the diameter of the narrower cylindrical portion 66 is 36 millimeters. Accordingly, the upper diameter of the bridge portion 64 is 54 millimeters and the lower diameter of the bridge portion is 36 millimeters. The counterbored portion 72 of the handling hole is 54 millimeters in diameter, leaving a 9 millimeter lip 76 to be engaged by the handling tool.

A number of fuel elements 78 are modified to receive control rods therethrough. As best shown in FIG. 4 a control rod receiving hole 80 with a diameter of 82.6 millimeters replaces the handling hole 60 and centermost coolant holes 82. A lip (not shown) resulting from the counterboring of such blocks serves as a means for engaging a fuel block handling apparatus so that these fuel rod receiving blocks may be handled in a manner similar to the rest of the blocks.

The fuel elements 12 are structured as shown in FIG. 4. The fuel chambers 18, coolant holes 20 and coolant grooves 22, taken together, constitute a triangular array with a predetermined pitch. Some fuel elements may be modified to accommodate fuel rods and edge effects at the periphery of the nuclear reactor core 10. Generally, the array of holes is such that six fuel chambers are proximate to each coolant hole not adjacent to a handling hole.

The fuel element of the preferred embodiment contains 144 fuel chambers 18 (138 in the case of a control rod receiving element 78), sixty coolant holes 20, and thirty coolant grooves 22. Of the coolant grooves, twenty-four grooves 22 are of semi-circular cross section, four per side 42, and the six edge grooves 48 are of one-third circular cross section. In the preferred embodiment coolant holes are 21 millimeters in diameter, and the fuel chambers are 15.9 millimeters in diameter; the holes are arranged with a 23.94 millimeter pitch leaving a minimum ligament thickness of 5.49 millimeters. Alternatively, the arrangement can be characterized as one triangular array of coolant holes and two triangular arrays of fuel chambers, each array having a pitch of 41.46 millimeters.

The stability and efficiency of a core employing the preferred embodiment can be enhanced by adding complementary depressions and elevations at the locations indicated at 84 of FIG. 4 on the top and bottom faces of the fuel blocks. Preferably, the depressions and elevations extend along or parallel to the perimeters of the top and bottom faces of each block.

Many configurations are possible. For example, hexagonal grooves could be cut into the top and bottom faces of each fuel block parallel to the perimeters of the faces. Preferably, the depressions are shallow enough so that the bottom depressions would not jeopardize the bottom of the adjacent fuel chambers. Metal or carbon inserts could be cemented into the top face depression to mate when the bottom face depressions with the columns are assembled.

An alternative configuration, not shown, could include a depression into the bottom face of each block. In this configuration the depression would extend from the location indicated in 74 FIG. 4 to the perimeters of the faces, forming a step rather than a valley as in the previous configuration. A mating elevation would be formed as part of the top face of each block. The elevation would be in the form of a step, rather than a ridge, so as to closely engage the depressions of the downwardly adjacent fuel block when core is assembled.

The use of such depressions and elevations is facilitated by the coolant hole and fuel chamber pattern of the present invention in contradistindiction to the pattern disclosed in U.S. Pat. No. 3,413,196 referred to above. The reorientation of holes from the patented patern 30° to the presently disclosed pattern, in addition to the advantages discussed above, provides lines unobstructed by coolant passageways for the introduction of seals in the form of complementary elevations and depressions.

The complementary depressions and elevations, which are interengaged on the assembled core, render the core far less sensitive to minor mechanical displacements of the fuel blocks. In other words, the gaps between vertically adjacent fuel blocks created by pressure differentials and debris or surface irregularities on the block faces, are significantly constricted by the presence of the interlocked depressions and elevations. Accordingly, there is less confusion on the intercolumn and intracolumn coolant flows. This means, at least in the case of reactor core using common orificing of patches of columns, that there is less cross-flow available that could throttle the intracolumn coolant passageways, or could backflow through the handling holes so as to preheat the coolant fluid. The lessening of this serious flow intermingling adds to the efficiency and predictability of the reactor core operation. The mating elevation and depressions also serve to maintain the alignment of the coolant passageways by limiting block movement.

The present embodiment may be compared favorably to a prototypical fuel element not embodying the present invention such as the fuel element presented in U.S. Pat. No. 3,412,196, which is incorporated herein as though quoted in full. In blocks of the same size, the preferred embodiment of the present invention allows 8% greater coolant capacity, 4.3% greater fuel capacity, and 20% greater minimum ligament thickness. The gain is due largely to the more effective utilization of space at the perimeter of the fuel blocks 16. The embodiment could be altered to provide a different distribution of gains in accordance with the present invention. If the original ligament minimum were to be maintained, either a 28% coolant capacity or a 30% fuel capacity gain could be achieved. Thus, the present invention provides for a more optimal compromise than that permitted by the prior art with respect to the parameters of fuel capacity, coolant cross section, and minimum ligament thickness.

As indicated above, the fuel elements 12 are stackable. In the illustrated embodiment, a column 14 comprises twelve stacked fuel elements. Additional blocks of graphite without fuel chambers or fuel, but with coolant holes, grooves, handling holes and pins, and cavities where needed, are stacked to make up the top and bottom reflector regions.

The pins 52 and cavities 54 assure that the coolant holes 20 align so as to form intracolumn coolant passageways extending axially through the column 14. The grooves 22 are also aligned so that the column is channeled completely through from top to bottom. In alternative configurations, this alignment function may be performed by mating elevations and depressions so that the pins are not necessary.

In the preferred embodiment two hundred forty-seven columns are interfitted side-by-side to form the nuclear reactor core which is roughly in the shape of a dodecagonal prism. Accordingly, 2,964 fuel elements are used along with at least 494 reflector blocks. The core area of the preferred embodiment is 26.96 square meters not including control rods. When the preferred seventy-four control rods are included, the core area is raised to 27.87 square meters.

When the core is assembled, the grooves 22 on each block 16 mate with corresponding grooves in radially adjacent blocks so as to form interblock coolant channels 30, as shown in FIG. 3. More specifically, the semicircular side grooves 46 each mate with corresponding side grooves of an adjacent block to form interblock coolant channels 30 and the one-third circle edge grooves 48 mate with two other such grooves 48 each in a distinct adjacent block also to form interblock coolant channels 30. The interblock coolant channels 30 align axially to form intercolumn coolant passageways 28.

The particular fuel element 12 illustrated has an arrangement of coolant holes 20, grooves 22 and fuel chambers 18 which efficiently remove heat from the fuel chambers and thereby hold the maximum temperature of the refractory material block 16 at a temperature lower than practically obtainable with other comparable fuel element arrangements. This can be a considerable advantage when a material such as graphite is used for the blocks 16 for the effect of differential thermal expansion and contraction, coupled with contraction as a result of neutron irradiation, can set up substantial stresses within individual graphite blocks 16. Accordingly, the lower the maximum temperature of the graphite blocks can be maintained, the lower are the resulting stresses which need be accommodated.

The total reactor core may contains about 1460 kilograms of 93% enriched uranium 235. The preferred nuclear fuel is in the form of spheroidal particles with an average outer diameter of about 500 microns packed into the fuel chambers 18. The particles comprise a solid solution of uranium dicarbide and thorium dicarbide with the thorium to uranium ratio being about 13 to 1. The center cores of these fuel particles measure about 300 to 420 microns, and a triplex pyrolytic carbon coating surrounds this center core. The innermost layer of spongy carbon measures about 30 microns. The intermediate layer of laminar pyrolytic carbon is about 35 microns thick, and the outer layer of columnar pyrolytic carbon is about 35 microns thick.

The preferred embodiment represents an improved reactor core, and in particular compares favorably with reactor cores assembled from fuel elements such as those disclosed in U.S. Pat. No. 3,413,196. Most significantly, the interblock coolant channels and the intercolumn coolant passageways establish a much greater mechanical stability throughout the core under stressful operating conditions that would otherwise produce uneven and disrupting fluid pressure distributions. The lead-ins 32 to the grooves, best shown in FIG. 3, further insure proper fluid passage. Thus, the invention increases the inherent safety in a nuclear reactor constructed in accordance with this invention.

The provision of interblock cooling may eliminate the necessity of sealing the junctures between intrablock coolant holes. This simplifies the design of fuel elements and makes fuel element handling more assured. Furthermore, the sealant used in the prior art tends to create pockets where gas pressure can accumulate in haphazard fashion, jeopardizing the stability of the core. By eliminating the sealant, the present invention again adds to the inherent safety of a reactor.

Further benefits of the present invention accrue from the more efficient space utilization it permits. In particular, the peripheries of the fuel elements 12 are put to productive use. The present invention further allows the fuel chambers and coolant holes to be arranged and spaced from one another so that three, usually conflicting, parameters could be simultaneously increased. In the first place, the fuel capacity of the core is increased, thereby providing greater energy production. Secondly, the coolant capacity is increased to facilitate heat transfer and help maintain low average graphite temperatures. Thirdly, minimum ligament size is increased so that the fuel blocks 16 have greater mechanical integrity and so are better able to resist the stresses imposed by high temperatures, heat gradients, and irradiation.

Thus, the above affords an improved nuclear reactor core and fuel element therefore. The description above presents one of many possible embodiments of the present invention. The following variations also embodying the invention are presented by way of illustration and not limitation.

The number and arrangement of the coolant holes and grooves and the fuel chambers may be altered, as can their diameters. This will allow alteration and fine tuning of the balance between fuel capacity, coolant flow capacity and minimum ligament size. Different arrangements among elements in a single core may be desirable to account for uneven heat distribution. Different materials, in particular higher grade graphites, might make smaller ligaments desirable.

Provisions for handling and stacking fuel elements could be modified. Different fuels and enrichments are feasible. The number and arrangement of columns could be changed as could the number of fuel elements in a column. The elements need not be hexagonal prisms; rectangular prisms are known, triangular prisms are feasible and non-prismatic shapes have been employed. The fuel elements could vary in shape within a single core; there are form combinations which are capable of close interfitting. The shape of the grooves and other holes could be altered and their extension could be other than vertical or axial. Some groups might be eliminated such as at the periphery of the core or for reasons of convenience and economy. These and other modifications are possible without going beyond the spirit and scope of the present invention.

What is claimed is:

1. A nuclear reactor core comprising a plurality of vertical columns of disengageable fuel elements stacked one atop another, said columns being so arranged in side-by-side relationship to form a substantially continuous horizontal array, each of said fuel elements including a block of refractory material having relatively good thermal conductivity and neutron moderating characteristics, said block having a pair of parallel flat top and bottom end faces and a plurality of sides which are substantially perpendicular to said end faces, the sides of each block being aligned vertically within a vertical column with the sides of vertically adjacent blocks, each of said blocks containing a plurality of fuel chambers including outer rows containing only fuel chambers along the sides of the block and having nuclear fuel material disposed therein, said blocks also containing a plurality of vertical coolant holes which are located inwardly of said fuel chambers in said outer rows and which are not located in said outer rows with said fuel chambers and which extend axially completely therethrough from end face to end face and which form continuous vertical intracolumn coolant passageways in the reactor core, said blocks having a plurality of vertical grooves extending along the sides of said blocks in predetermined locations so that when the core is assembled the grooves of each block mate with corresponding grooves in adjacent blocks to form interblock channels which align in groups to form continuous vertical intercolumn coolant passageways in the reactor core. Said blocks being in the form of a regular hexagonal prism with each side of the block having a plurality of said vertical grooves therein defining one half of one of the coolant interblock channels, six corner edges on said blocks having said vertical grooves therein defining one-third of an interblock channel, said vertical sides of said blocks defining planar vertical surfaces abutted against adjacent vertical planar surfaces of adjacent blocks said fuel chambers and said interblock channels and said intracolumn passageways being arranged to define triangular arrays at the sides of adjacent blocks, whereby an increase is realized in coolant capacity, fuel capacity and ligament thickness over blocks of the same size without such interblock channels and said arrays.

2. A nuclear reactor core comprising a plurality of vertical columns of disengageable fuel elements stacked one atop another, said columns being arranged in side-by-side relationship to form a substantially continuous horizontal array, each of said fuel elements including a dense graphite block essentially in the form of a regular hexagonal prism, each of said blocks containing a plurality of vertical fuel chambers having nuclear fuel material disposed therein, said fuel chambers being located in a triangular array of predetermined pitch, and including outer rows containing only fuel chambers, along the sides of the block, said blocks also containing a plurality of vertical coolant holes which extend axially completely therethrough from end face to end face and which form continuous vertical intracolumn coolant passageways in the reactor core, the coolant holes being located inwardly of said fuel chambers in said outer rows and not located in said outer rows and in a triangular array of the same pitch each of said blocks having a plurality of vertical grooves extending completely along the sides and vertical edges of the block extending from end face to end face in predetermined locations so as to extend the array of coolant holes and so that when the core is assembled the grooves of each block mate with corresponding grooves in adjacent such blocks to form interblock coolant channels which align to form intercolumn coolant passageways, said fuel chambers in said outer rows and said interblock channels and said intracolumn column coolant passageways being arranged to define triangular arrays at the sides of adjacent blocks, the six vertical sides of the block defining planar vertical surfaces for abutting adjacent planar vertical surfaces of adjacent blocks, the vertical grooves in the block sides intermediate the block edges defining one-half of an interblock coolant channels, and vertical grooves in the corner edges of the block defining one-third of an interblock coolant channel whereby an increase is realized in coolant capacity, fuel capacity and ligament thickness over blocks of the same size without interblock channels and said arrays.

3. The nuclear reactor core of claim 2 wherein each of said blocks has means for precisely axially aligning one of these blocks with another of these blocks axially adjacent it, and means for engaging fuel element moving means.

* * * * *

UNITED STATES PATENT AND TRADEMARK OFFICE
CERTIFICATE OF CORRECTION

PATENT NO. : 4,569,820

DATED : February 11, 1986

INVENTOR(S) : Peter Fortescue

It is certified that error appears in the above-identified patent and that said Letters Patent is hereby corrected as shown below:

```
Column 2, line 19  change "comprises" to --compromises--.
Column 2, line 21  change "comprises" to --compromises--.
Column 2, line 34 change  "patent" to --patch--.
Column 2,  line 54 change "efficienty" to --efficiency--.
Column 2, line 57  change "uncertainity" to --uncertainty--.
Column 2, line 68  change "comprises" to --compromises--.
Column 3, line 25  change "faes" to --faces--.
Column 3 line 39  change "intracolumnflow" to --intracolumn
   flow--.
Column 6, line 60  change boldfaced numbers "144" and
   "138" to lightfaced print.
Column 7, line 34  change "contradistindiction" to
   --contradistinction--.
Column 7, line 65  change "3,412,196" to --3,413,196--.
Column 8, line 64  change "contains" to --contain--.
```

Signed and Sealed this

Sixteenth Day of September 1986

[SEAL]

*Attest:*

DONALD J. QUIGG

*Attesting Officer*   *Commissioner of Patents and Trademarks*